United States Patent [19]

Simokat

[11] 4,074,338

[45] Feb. 14, 1978

[54] MULTI-ELEMENT SURGE ARRESTER

[75] Inventor: Frank L. Simokat, Babylon, N.Y.

[73] Assignee: TII Corporation, Lindenhurst, N.Y.

[21] Appl. No.: 743,298

[22] Filed: Nov. 19, 1978

[51] Int. Cl.[2] ............ H02H 9/06

[52] U.S. Cl. ............ 361/129

[58] Field of Search ............ 361/129, 120, 119, 117; 313/217

[56] References Cited

U.S. PATENT DOCUMENTS

| | | | |
|---|---|---|---|
| 2,096,143 | 10/1937 | Swart | |
| 2,799,808 | 7/1957 | Hasselhorn | |
| 2,875,366 | 2/1959 | Bauman et al. | 361/129 X |
| 2,967,256 | 1/1961 | Rees | 361/129 X |
| 3,312,868 | 4/1967 | Vodicka | |
| 3,535,582 | 10/1970 | Kawiecki | |
| 3,816,802 | 6/1974 | Crask et al. | |

FOREIGN PATENT DOCUMENTS

| | | |
|---|---|---|
| 643,646 | 9/1950 | United Kingdom. |

*Primary Examiner*—Harry E. Moose Jr.

*Attorney, Agent, or Firm*—Morgan, Finnegan, Pine, Foley & Lee

[57] ABSTRACT

A multi-element gas filled surge arrester is disclosed in the form of a gas-filled generally cylindrical casing having an elongated rod-like ground electrode disposed along the casing axis with its ends terminating in casing end caps, and a linear alternating array of conductive and insulative sleeves interposed between the end caps, coaxial with the ground rod, and defining the cylinder of the casing. The assembly thus provides a stack of annular interacting ionizable gaps each of which may have its annular electrode connected to a respective terminal of repeater or other multi-terminal intermediate equipment having both input and output circuits, whereby ionization of one gap due to a surge appearing at its respective line terminals will promptly trigger ionization of the other gaps thus mitigating potentially damaging differential current flow resulting from differing strike potentials.

7 Claims, 1 Drawing Figure

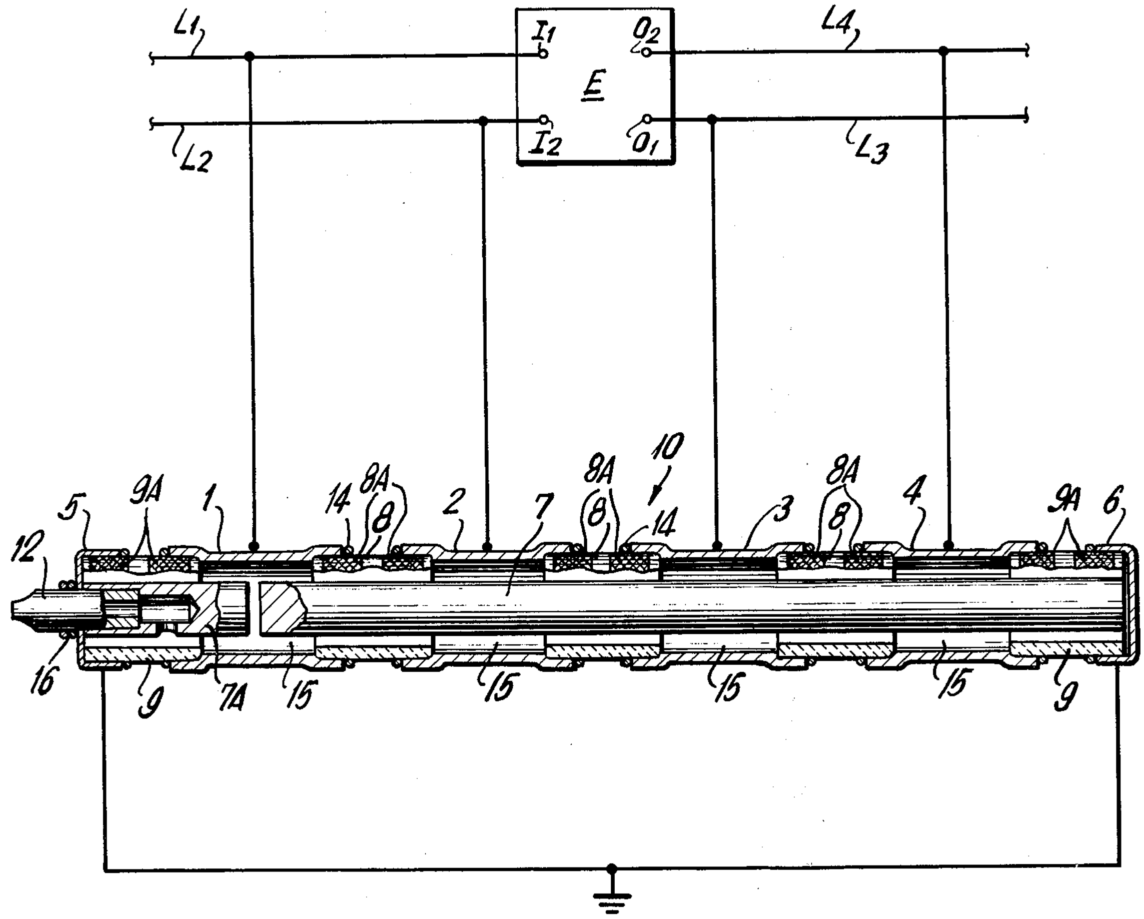
L1
L2
I1
I2
E
O2
O1
L4
L3
12
5
9A
1
14
8A
8
2
7
10
3
4
6
16
9
7A
15

MULTI-ELEMENT SURGE ARRESTER

BACKGROUND

For the protection of repeaters, relay and other types of equipment interposed in transmission lines and the like, and thus having both input and output terminals, it is a recognized practice to employ two gas surge arresters, one connected to the input, and the other to the output terminals with both also connected to the ground terminal. This configuration provides ionizable gaps between the input line(s) and ground, and the output line(s) and ground. The object of these arrangements is to provide protection of the repeater, etc. from surges, whether they originate upstream or downstream of the equipment.

While the surge arresters at both the input and output terminals may have equivalent ratings so far as breakdown potential is concerned, in practice the actual voltage necessary to ionize the tubes will vary. For example, a tube with a strike voltage rated at 350 volts may actually strike at voltages as low as 300 volts or as high as (and sometimes higher than) 500 volts.

As a consequence of this range of uncertainty respecting the striking voltage, conditions can occur wherein, in the presence of a surge originating at either the input or output terminals of the equipment, the difference in striking voltages between the input and output arresters is sufficiently different such that an excessive current may flow through the equipment causing damage. This danger has become increasingly acute with the proliferation of very low power solid state circuits.

While this problem may be mitigated by employing matched tubes, this is a relatively expensive proposition both in original installation cost and in overhead, maintenance and replacement costs. Further, some deterioration in matching can occur with time.

It is accordingly an object of the invention to provide a protector arrangement for equipment having input and output terminals, which does not depend upon matching, and which is relatively inexpensive, easy to install and easy to replace, and which minimizes the development of damaging differential surge currents.

Other objects and advantages of the invention will be apparent from the following description or will be learned in the course of practicing the invention.

SUMMARY OF THE INVENTION

The foregoing disadvantages are mitigated and improvements realized, by a multi-element gas tube surge arrester which comprises a casing formed of an alternating succession of insulator sleeves and conductive sleeves sealably connected together to define an array of insulated annular electrodes, a rod like electrode disposed within the interior of said sleeves to provide a common electrode for said annular electrodes and to define annular gaps therewith, end caps connected to said array with at least one of said caps being electrically connected to said common electrode, at least said one end cap and each of said annular electrodes being adapted for connection to one of a plurality of equipment input and output terminals.

BRIEF DESCRIPTION OF THE DRAWING

Serving to illustrate an exemplary embodiment of the invention is the drawing constituting an elevational, partly cross-sectional and partly schematic, view of the multi-element tube and its interconnection with the equipment to be protected.

DESCRIPTION OF THE PREFERRED EMBODIMENT

The drawing illustrates a multi-element tube 10 interconnected with the equipment E, the latter having input terminals $I_1$ and $I_2$ connected to respective input lines $L_1$ and $L_2$, and output terminals $O_1$ and $O_2$ connected to output lines $L_3$ and $L_4$, respectively.

The arrester 10 is of a generally cylindrical configuration having end caps 5 and 6. The latter is electrically and mechanically connected to one end of a common, metallic electrode 7 of generally rod-like configuration which functions as the ground electrode along with a similar but shorter axial electrode 7A connected to end cap 5. Electrode 7A includes a conventional fill/pinch tube arrangement 12 for charging the interior of tube 10, and acts functionally as a part of common electrode 7.

The cylindrical surfaces of the casing are formed of four annular metal electrodes 1, 2, 3 and 4 generally coaxial with electrode 7, the electrodes being separated from each other by sleeve-shaped insulators 8 to which the adjacent electrodes are telescopically fitted and sealably connected, and to end insulator sleeves 9, one between end cap 5 and electrode 1, and the other between end cap 6 and electrode 4. Insulators 8 and 9 are preferably ceramic. The gaps 15 between each of the electrodes 1, . . . 4 and electrode 7 are substantially equal and larger than the gap between the opposing faces of the electrodes 7, 7A.

The foregoing caps, sleeves and electrodes are sealably interconnected in known manner, e.g. by the use of braze rings 14 at each insulator-electrode junction (the rings being shown as they appear prior to melting), and the interior of the casing thus formed is filled with a gas such as Argon which, in an illustrative embodiment is under a pressure of 40 mm., the gas being originally supplied by way of the pinch tube 12 which is sealed in the usual manner upon the completion of the filling operation.

The aperture in cap 5 through which the pinch tube 12 extends is sealed in any convenient manner, e.g., by brazing with the aid of braze rings 16. To expedite the sealing of the caps 5, 6 and electrodes 1, 2, 3 and 4 to the adjoining insulator spaces 8, 9 the latter may include respective metallized surfaces 8A, 9A.

An exemplary gap dimension for gaps 15 in the illustrative embodiment is .060 inches with the gap gas pressure and other pertinent parameters arranged to provide a strike voltage of 250–500 volts DC.

The illustrative circuit connection provides a connection between electrodes 1 and 2 and respective input lines $L_1$ and $L_2$ of the equipment E which are connected to input terminals $I_1$ and $I_2$ of the latter; the electrodes 3 and 4 are in similar manner connected to output lines $L_3$ and $L_4$ and therefore to the respective output terminals $O_1$ and $O_2$.

Since all of the gaps are in communication, a triggering surge on any line will trigger ionization of all the gaps thus reducing both the input and output potentials to very nearly the same value. Damaging differential currents are thus prevented.

What is claimed is:

1. A multi-element protector comprising:

1. a casing formed of an alternating succession of insulator elements and conductive elements sealably connected together to define an array of insulated generally annular electrodes, 2. an elongated electrode disposed within the interior of said elements to provide a common electrode for said annular electrodes and to define annular gaps therewith,
3. end caps connected to said array to cap said casing, at least one of said caps being electrically connected to said common electrode,
4. and at least said one end cap and each of said annular electrodes having means for connection to one of a plurality of equipment input and output terminals whereby a surge appearing across certain of said terminals causes ionization of the respective gap which triggers in turn ionization of the other gaps to minimize differential current flow between all of said terminals.

2. A multi-element protector as defined in claim 1 in which there are at least three of said conductive elements.

3. A multi-element protector as defined in claim 1 in which there are at least four of said conductive elements.

4. A multi-element protector as defined in claim 1 in which said common electrode is of rod-like configuration.

5. A multi-element protector as defined in claim 4 in which the ends of said common electrode are each connected to a respective one of said caps.

6. A multi-element protector as defined in claim 1 wherein said casing contains a noble gas under pressure.

7. A multi-element protector as defined in claim 6 wherein the pressure of said gas is in the order of 40 millimeters and wherein said annular gaps are in the order of 0.060 inches.

* * * * *